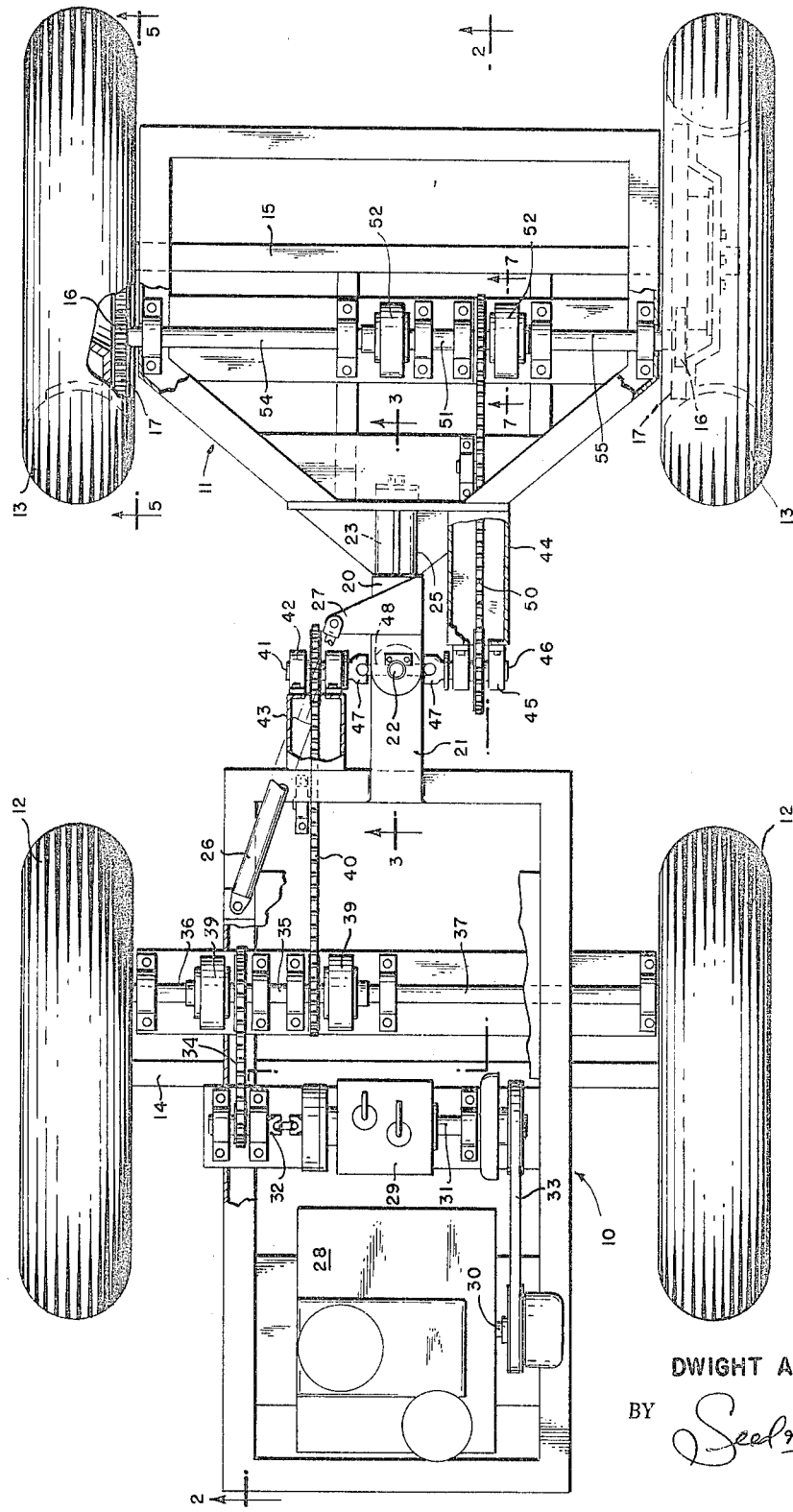
Dec. 13, 1966     D. A. GARRETT     3,291,244
CHAIN-DRIVEN ARTICULATING FRAME VEHICLE
Filed March 31, 1965     3 Sheets-Sheet 1
FIG—1
INVENTOR.
DWIGHT A. GARRETT
BY Seed & Berry
ATTORNEYS Dec. 13, 1966 D. A. GARRETT 3,291,244
CHAIN-DRIVEN ARTICULATING FRAME VEHICLE
Filed March 31, 1965 3 Sheets-Sheet 2
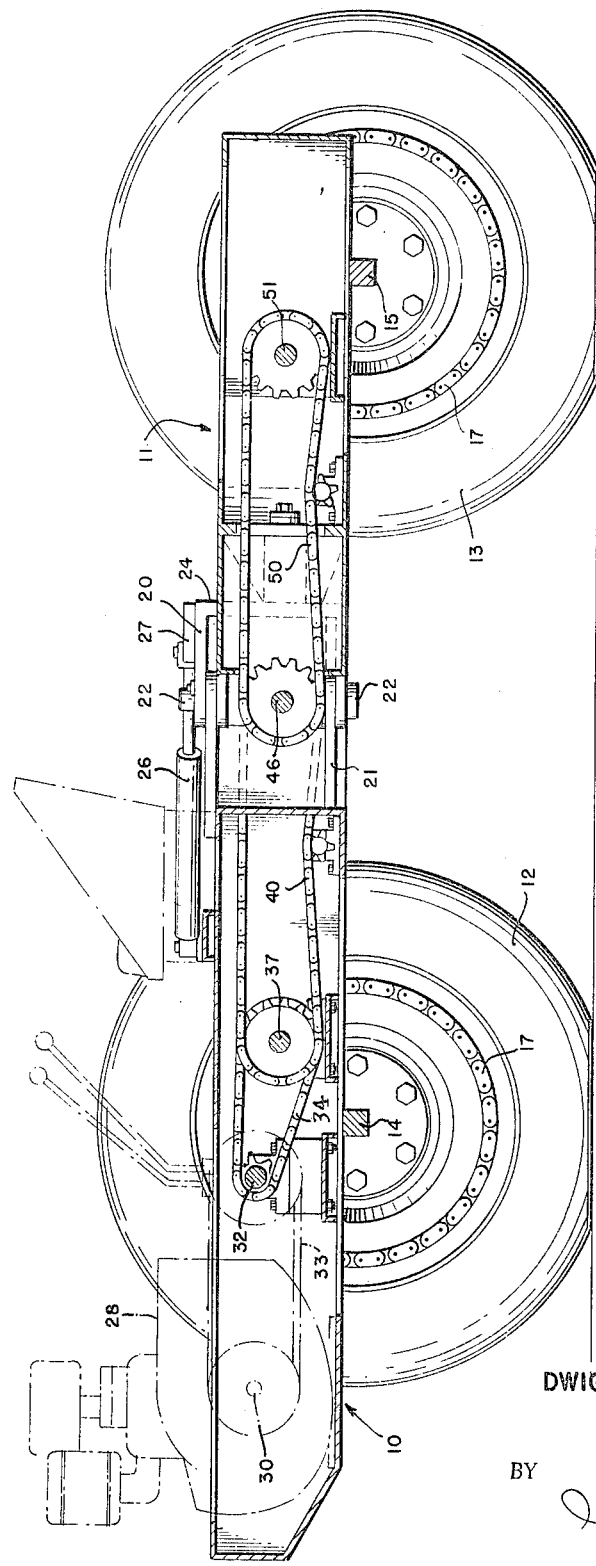
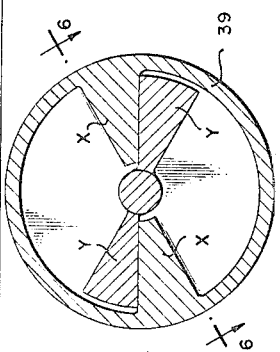
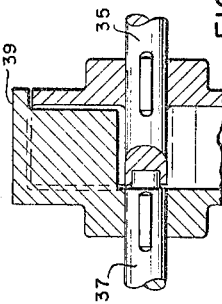
DWIGHT A. GARRETT
INVENTOR.
BY Seed & Berry
ATTORNEYS Dec. 13, 1966     D. A. GARRETT     3,291,244
CHAIN-DRIVEN ARTICULATING FRAME VEHICLE
Filed March 31, 1965     3 Sheets-Sheet 3
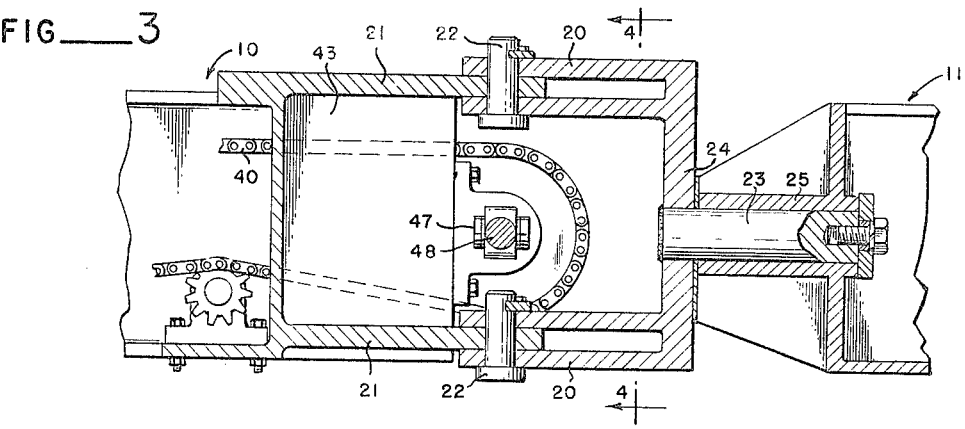
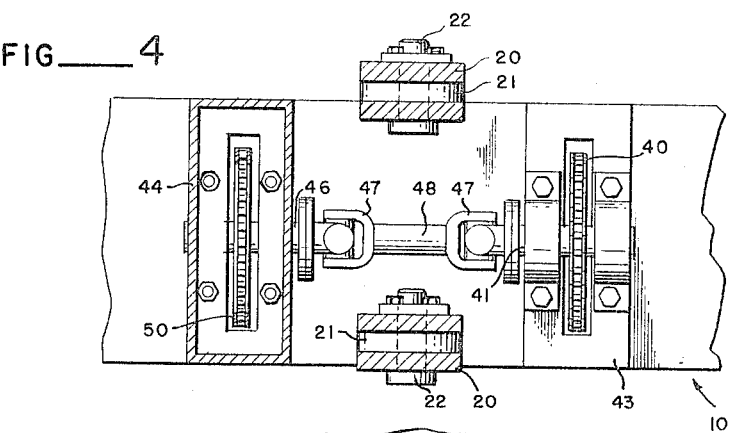
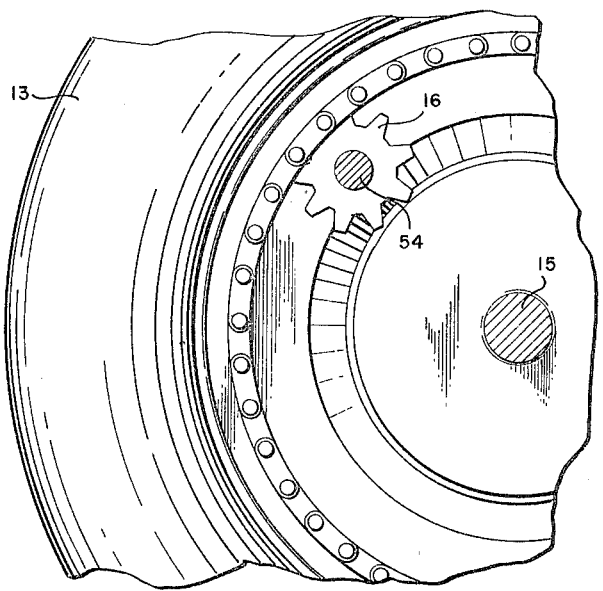
DWIGHT A. GARRETT
INVENTOR.
BY Seed & Berry
ATTORNEYS

3,291,244
CHAIN-DRIVEN ARTICULATING FRAME VEHICLE
Dwight A. Garrett, Enumclaw, Wash., assignor to Garrett Enumclaw Co., a corporation of Washington
Filed Mar. 31, 1965, Ser. No. 444,138
7 Claims. (Cl. 180—51)

This invention relates to a tractor vehicle of the type providing front and rear frame sections each supporting an axle for a respective pair of driven ground wheels, and between the two frame sections having a yoke connected to one frame section for swing motion of the yoke about a vertical axis located on the longitudinal median line of the section and connected to the other frame section for swivel motion about a horizontal axis which traverses the swing axis and occupies the longitudinal median line of the latter frame section. The swing movement is under the control of the operator and serves as the instrumentality by which the vehicle is steered. The swivel movement compensates the two frame sections to irregularities in the ground over which the vehicle travels. Power is taken from a single engine mounted on one of the two frame sections for driving the two sets of wheels in concert.

For its general object the present invention aims to provide a vehicle of the described character having a perfected system for passing the drive from the engine to the two axles which is considerably simpler and more inexpensive to construct, and easier and cheaper to maintain than drive systems which have been heretofore devised for the type of vehicle to which the present invention pertains.

More particularly, the invention aims to provide a vehicle of the described character having an advanced form of chain drive for transmitting power from the engine to the two axles.

The invention has the further and particular object of providing for each axle a simple means allowing one ground wheel to be driven at an over-running speed where negotiated turns or variables in the road surface would otherwise cause tire scuffing.

It is a yet additional object of the invention to provide for each of the four ground wheels of the vehicle a reduction final drive of unusual simple and inexpensive construction.

The above and yet further objects and advantages in view will appear and be understood in the course of the following description and claims, the invention consisting in the novel construction and in the adaptation and combination of parts hereinafter described and claimed.

In the accompanying drawing:

FIGURE 1 is a top plan view with parts broken away and shown in section, illustrating a tractor vehicle constructed to embody preferred teachings of the present invention.

FIG. 2 is a longitudinal vertical sectional view on line 2—2 of FIG. 1.

FIG. 3 is a fragmentary longitudinal vertical sectional view drawn to an enlarged scale on line 3—3 of FIG. 1.

FIG. 4 is a fragmentary transverse vertical sectional view on line 4—4 of FIG. 3.

FIG. 5 is a fragmentary longitudinal vertical sectional view drawn to an enlarged scale on line 5—5 of FIG. 1; and FIGS. 6 and 7 are fragmentary sectional views detailing a limited slip differential employed in the drive system, drawn to an enlarged scale on lines 6—6 of FIG. 7 and 7—7 of FIG. 2, respectively.

Referring to said drawings, the front and rear frame sections are denoted by 10 and 11, respectively. For each section a respective one of two driven ground wheels is journaled for rotation upon each of the two ends of a dead axle. 12 and 13 designate the two sets of ground wheels, and 14 and 15 the two dead axles. A respective reduction final drive is provided for each of the ground wheels, comprised of a driven sprocket wheel 16 located internally with respect to, and in mesh with, an endless length of chain 17 welded to the inner face of the wheel concentric to the axis about which the wheel turns. The employment of a chain-and-sprocket reduction drive, as distinguished from a pinion and an internal gear wheel, has the advantage of being self-cleaning. From the fact that the interstices of the chain are through-openings, dirt and mud entering these interstices is ejected by the teeth of the sprocket wheel rather than, as is the case with the closed pockets of a gear wheel, being compacted by pinion teeth against the back and side walls of the pockets. The drive to the sprocket wheels will be hereinafter described.

For the articulation of the two frame sections a yoke is provided. Each of the two arms 20 of the yoke is forked. A pair of vertically spaced horizontal tongues 21 project rearwardly as rigid prolongations of the front section on the substantial longitudinal median line thereof to fit in the furcate arms of the yoke, and are hingedly connected thereto by pins 22 for swing movement about a coinciding vertical axis. A stem 23 welded or otherwise rigidly secured to the cross-arm 24 of the yoke extends rearwardly therefrom and is journaled for swivel movement about a longitudinal axis normal to the hinge axis within a muff 25 provided by the rear frame section. The swivel mounting permits one frame section to rock freely relative to the other in compensation of ground irregularities. The hinge movement is controlled by a hydraulic jack 26 extending longitudinally of the tractor between the front frame section and a laterally extending lever arm 27 of the yoke, and performs the steering function.

The engine 28 for the tractor is carried by the front frame section, occupying a position to the front of a transmission 29. The axis of the engine's output shaft 30, and that of the transmission's input and output shafts 31 and 32, respectively, are disposed transversely of the frame section. A chain 33 transfers the drive from shaft 30 to shaft 31, and a chain 34 carries the drive rearwardly from shaft 32 to a paralleling stub shaft 35. The stub shaft is located central to and co-axial with two rotary shafts 36 and 37.

The two sprocket wheels 16 for the ground wheels 12 of the front frame section are each fixed to the outer end of a respective one of said two shafts 36 and 37. The inner ends of the shafts are each drive-coupled to a related end of the stub shaft 35 by a respective limited-slip differential 39. Detailed in FIG. 6, this differential provides two members each providing a pair of diametrically opposite jaws, as x—x and y—y. The jaws interfit and, viewed from the end, are each sectoral in shape with the included arc having considerably less than a quarter-circle span. One of the two ground wheels 12 thus can over-run the other. While limited to less than a full turn, the differential action which this inexpensive and trouble-free lost-motion drive affords is found to be sufficient to preclude tire scuffing under the working conditions which the tractor normally encounters.

The driving stub shaft 35 has a second sprocket wheel fixed thereto and a chain 40 carries the drive rearwardly to a sprocket wheel 41 fixed to a stub shaft 41 journaled in bearings 42 for rotation about a transverse horizontal axis traversing the axis about which the articulating frame sections swing. These bearings are carried upon the rear end of a boxed rearward prolongation 43 of the front frame section. Such prolongation parallels and is spaced to one side of the longitudinal median line of the front frame section. The rear frame section has a similarly boxed forwardly extending prolongation 44 which likewise is located in paralleling spaced relation to the longitudinal median line of the section, albeit at the side of the hinge axis opposite that occupied by the prolongation 43. Bearings 45 are carried upon the front end of such latter prolongation and support a stub shaft 46 so that the latter rotates about a transverse axis which coincides with the axis of the stub shaft 41 when the longitudinal median lines of the two frame sections coincide. Inner ends of the stub shafts 41 and 46 are spaced in a moderate degree from said swing axis of the articulating sections and connect by universals 47 with an intervening drive-transferring short spindle 48. The box form of the prolongations 43 and 44 gives housed protection to the rear end of the chain 40 and to the front end of a chain 50 which extends rearwardly from a sprocket wheel fixed to the stub shaft 46 to a sprocket wheel fixed to a driving stub shaft 51. Said shaft 51 is the functioning counterpart of the driving stub shaft 35 and operates in the same manner, namely through limited-slip differentials (here denoted by 52) to drive two co-axial rotary shafts 54 and 55. The two sprocket wheels 16 for the rear ground wheels 13 are fixed one to the outer end of the shaft 54 and the other to the outer end of the shaft 55.

Each of the driving stub shafts 35 and 51 and the driven shafts 36, 37, 54 and 55 receive their journal mounting from a pair of frame-carried bearings.

For simplicity in illustration I have deleted any showing of working equipment, such as a dozer blade, material-handling head, high-arch or the like, with which the tractor is or may be rigged. The invention pertains only to the advanced drive system, applied to a 4-wheel drive vehicle having front and rear frame sections which articulate for swing motion about a vertical axis and admit to relative rocking action about a longitudinally extending horizontal axis. It is thought that the novel manner in which the drive is passed from an engine carried by one frame section to the four driven wheels will have been clear from the foregoing detailed description of the now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

What I claim is:

1. A steerable vehicle comprising: a front frame section supporting a power plant, a rear frame section hinged to said front section for swing movement about a vertical axis, means for swinging the rear section relative to the front section about said hinge axis for steering the vehicle, a respective set of two traction wheels carried by each frame section for rotation about a coinciding transverse horizontal axis, one wheel at each of the two sides of the section, a cross-shaft on each frame section journaled for rotation about an axis paralleling the rotary axis of the related traction wheels and in each instance comprised of a driving center section coupled by limited-slip differentials to driven end sections which lie co-axial to the center section, said limited-slip differentials comprising complementing members each providing a pair of diametrically opposite jaws which interfit, the jaws of one member with the jaws of the other member, the jaws being sectoral in shape with the included arc spanning considerably less than a quarter-circle, stub shafts journaled at the inner ends of the frame sections for rotation about transverse horizontal axes which traverse the hinge axis of the sections and coincide when the longitudinal median lines of the frame sections are in an in-line relation, said stub shafts having their inner ends spaced apart, a spindle extending between and connected by universals with said inner ends of the stub shafts, driving connections from the power plant to both the cross-shaft and the stub shaft of the front section, a driving connection from the stub shaft of the rear section to the cross-shaft of the rear section, and intermeshing means on the cross-shafts and the traction wheels producing a reduction final drive to each of the wheels.

2. A steerable vehicle as claimed in claim 1 having a connection between the two sections permitting relative swivel motion of the two sections about a horizontal axis extending longitudinally of the vehicle.

3. A steerable vehicle as claimed in claim 1 in which the driving connections from the power plant to the cross-shaft and stub shaft of the front section and from the stub shaft to the cross-shaft of the rear section is a chain drive.

4. A steerable vehicle as claimed in claim 3 having a transmission located between the power plant and the cross-shaft of the front section, said power plant and the transmission being disposed cross-wise to the section so that the output shaft of the power plant and the input and output shafts of the transmission parallel the cross-shaft and by such paralleling permit a direct chain drive from the output shaft of the power plant to the input shaft of the transmission and from the output shaft of the transmission to the cross-shaft.

5. A steerable vehicle as claimed in claim 3, the stub shafts being each mounted upon the end of a boxed prolongation of the concerned frame section which parallels the longitudinal median line of the section, the chains which drive said stub shafts being housed by said boxed prolongations.

6. A steerable vehicle comprising: a front frame section supporting a power plant and at the rear end providing vertically spaced tongues pointing rearwardly on the longitudinal median line of the section. a rear section having a forwardly pointing horizontal muff located on the longitudinal median line of the section, a yoke providing a cross-arm from which a stem points rearwardly and is journaled in the muff for swivel movement about a horizontal axis extending longitudinally of the rear section and two arms point forwardly and are hinged to the tongues for swing movement about a coinciding vertical axis, a double-acting hydraulic jack extending between the front frame section and the yoke for swinging the yoke so as to steer the vehicle, a respective set of two traction wheels carried by each frame section at the opposite sides thereof for rotation about a transverse horizontal axis, a respective cross-shaft journaled on each section for rotation about an axis parallel with and offset from the rotary axis of the related traction wheels, the facing ends of said frame sections each having a prolongation extending rearwardly in the instance of the front section and forwardly in the instance of the rear section one spaced to one side and the other spaced to the other side of the swing axis, respective stub shafts journaled from said prolongations for rotation about transverse horizontal axes which each traverse said swing axis and coincide when the two frame sections occupy positions such that their median longitudinal vertical planes coincide, the facing ends of said stub shafts being spaced apart, a spindle extending between and connected by universals with said facing ends of the stub shafts, chain drives from the power plant to the cross-shaft of the front section, from said cross-shaft to the stub shaft of the front section, and from the stub shaft of the rear section to the cross-shaft of the rear section, and intermeshing means on the cross-shafts and the traction wheels producing a reduction final drive to each of the wheels, the reduction final drives comprising, for each traction wheel, a ring-shaped length of chain rigidly secured to the inside face of the traction wheel in a position concentric to the rotary axis of the wheel and placing the interstices of the chain radial to said rotary axis, and a sprocket wheel fixed to the related end of the related cross-shaft within the confines of the ring-shaped chain with its teeth engaging in said interstices of the chain.

7. A steerable vehicle comprising: a front frame section supporting a power plant, a rear frame section hinged to said front section for swing movement about a vertical axis, means for swinging the rear section relative to the front section about said hinge axis for steering the vehicle, a respective set of two traction wheels carried by each frame section for rotation about a coinciding transverse horizontal axis, one wheel at each of the two sides of the section, a cross-shaft on each frame section journaled for rotation about an axis paralleling the rotary axis of the related traction wheels, stub shafts journaled at the inner ends of the frame sections for rotation about transverse horizontal axes which traverse the hinge axis of the sections and coincide when the longitudinal median lines of the frame sections are in an in-line relation, said stub shafts having their inner ends spaced apart, a spindle extending between and connected by universals with said inner ends of the stub shafts, driving connections from the power plant to both the cross-shaft and the stub shaft of the front section, a driving connection from the stub shaft of the rear section to the cross-shaft of the rear section, and intermeshing means on the cross-shafts and the traction wheels producing a reduction final drive to each of the wheels, said reduction final drives comprising a respective sprocket wheel fixed to each end of each cross-shaft and having the teeth engaging in the interstices of a ring-shaped length of chain rigidly secured to the inside face of the related traction wheel concentric to the rotary axis of the wheel.

References Cited by the Examiner

UNITED STATES PATENTS

| | | | |
|---|---|---|---|
| 1,373,981 | 4/1921 | Smith | 180—50 |
| 1,623,214 | 4/1927 | Storey | 180—50 |
| 2,835,397 | 5/1958 | Wagner. | |
| 3,049,186 | 8/1962 | Garrett | 180—51 |
| 3,049,942 | 8/1962 | Kohler | 74—710.5 |
| 3,186,258 | 6/1965 | Meldola | 74—710.5 |

A. HARRY LEVY, *Primary Examiner.*